United States Patent [19]

Matsuyama

[11] Patent Number: 4,957,354
[45] Date of Patent: Sep. 18, 1990

[54] OPTICAL APPARATUS FOR PRODUCING A SPECIAL PHOTOGRAPHIC EFFECT

[75] Inventor: Shinichi Matsuyama, Tokyo, Japan
[73] Assignee: Canon Kabushiki Kaisha, Tokyo, Japan
[21] Appl. No.: 262,351
[22] Filed: Oct. 25, 1988
[30] Foreign Application Priority Data
  Oct. 29, 1987 [JP]  Japan .................................. 62-274401
[51] Int. Cl.⁵ .............................................. G02B 7/28
[52] U.S. Cl. ..................................... 350/431; 350/430
[58] Field of Search ................................ 350/431, 430
[56] References Cited

U.S. PATENT DOCUMENTS

| | | |
|---|---|---|
| 4,043,642 | 8/1977 | Hirose et al. . |
| 4,124,276 | 11/1978 | Okano et al. . |
| 4,310,221 | 1/1982 | Momiyama et al. ................. 350/431 |
| 4,825,237 | 4/1989 | Hatase et al. ....................... 350/430 |
| 4,826,301 | 5/1989 | Ikemori ............................... 350/431 |

Primary Examiner—Bruce Y. Arnold
Assistant Examiner—Rebecca Gass
Attorney, Agent, or Firm—Fitzpatrick, Cella, Harper & Scinto

[57] ABSTRACT

A soft focus lens comprising a lens for softening arranged to axially move to selectively change the soft focus effect, a lens for focus adjustment arranged to axially move to adjust the focus, a driver for moving the lens for focus adjustment, a selector device for moving the lens for softening to select axial positions and a computing circuit for computing the amount of movement of the lens for focus adjustment to cancel the shift of the focal point resulting from the movement of the lens for softening and producing an output to the driver.

16 Claims, 4 Drawing Sheets

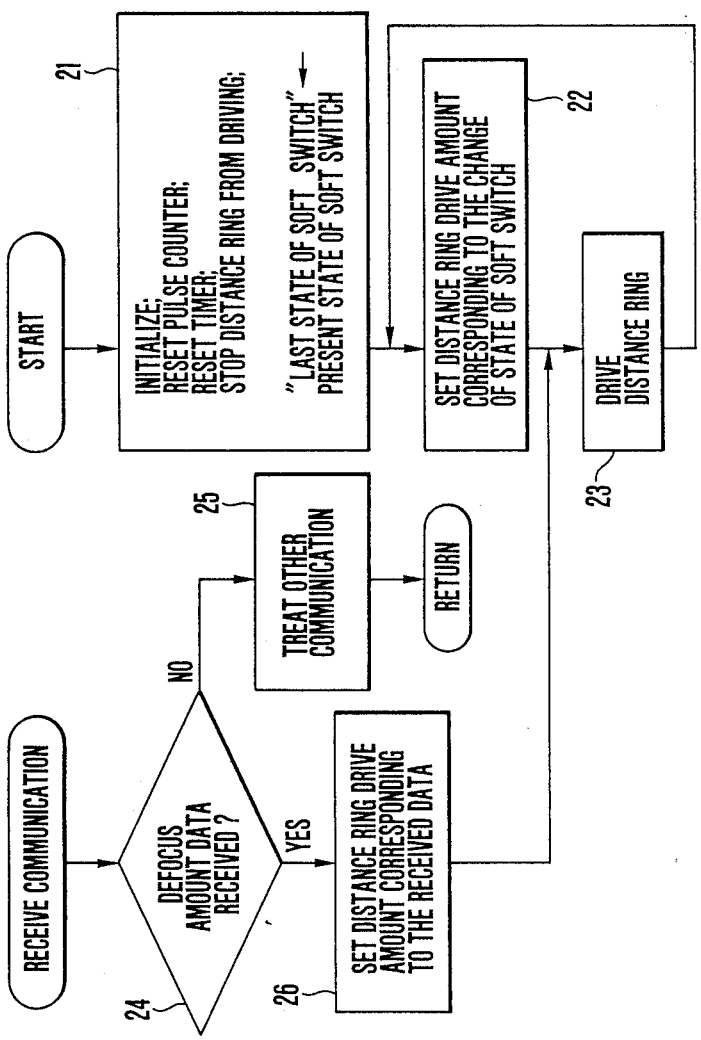

OPTICAL APPARATUS FOR PRODUCING A SPECIAL PHOTOGRAPHIC EFFECT

BACKGROUND OF THE INVENTION

1. Field of the Invention

This invention relates to improvements in a soft focus lens for a camera capable of changing over between soft focus and normal focus or between degrees of soft focus.

2. Description of the Related Art

There are known soft focus lenses in which one of the constituent lenses is axially moved to intentionally produce spherical-aberration in the image when a soft focus effect is desired. The conventional soft focus lens has a drawback that the focal point shifts in response to changing over between the soft focus and the normal focus or to selection of a different degree of soft focus (hereinafter referred to as "selective soft control"). For this reason, even if focusing has once been accomplished, the later performance of the selective soft control would cause the image to be taken out of sharp focus. Hence, re-adjustment of the focus is required. On attempt to solve this relies on the design of a mechanical mounting for the lens, but its size and the complexity of its structure are liable to increase. The lens system which mechanically realizes the re-adjustment of the focus is known in U.S. Pat. Nos. 4,124,276 and 4,310,221.

In recent years, by the development of the auto-focus technique, the operation of re-adjusting the focus has become relatively easy. Yet, because the depression of the release button of the camera to the first stroke must be repeated, or because as this repeated depression is followed by actuation of the auto-focus apparatus, the image sensor using a CCD or the like requires an integration time and the computer takes further time to discriminate whether the image is in focus and, if out of focus, to compute the distance by which, the focusing ring must be moved and its direction from the signal of the image sensor, and the response is caused to delayed. Another problem is that when effecting the selective soft control, the camera must be kept on hold in alignment with the same object to be photographed. The technique of re-adjusting the focus of the soft focus lens by the output of the focus detecting device is mentioned in U.S. patent application Ser. No. 926,648 now U.S. Pat. No. 4,826,301 (Japanese Laid-Open Patent Applications Nos. Sho 62-112114, 62-124515 and 62-205308.

Incidentally, though not being relevant to the soft focus effect, the technique wherein the movement of one lens component is compensated by moving another lens component is mentioned in, for example, U.S. Pat. No. 4,043,642.

SUMMARY OF THE INVENTION

An object of the invention is to make it possible that, in the case that the mode of the lens system is changed to select the soft focus mode, the lens system is quickly set to a state soft focus photography is possible.

BRIEF DESCRIPTION OF THE DRAWINGS

FIG. 2 is a table illustrating the output states of a soft switch.

FIG. 3 to FIG. 5 are flowcharts to explain the operation of the embodiment.

DETAILED DESCRIPTION OF THE PREFERRED EMBODIMENTS

Figure 1:
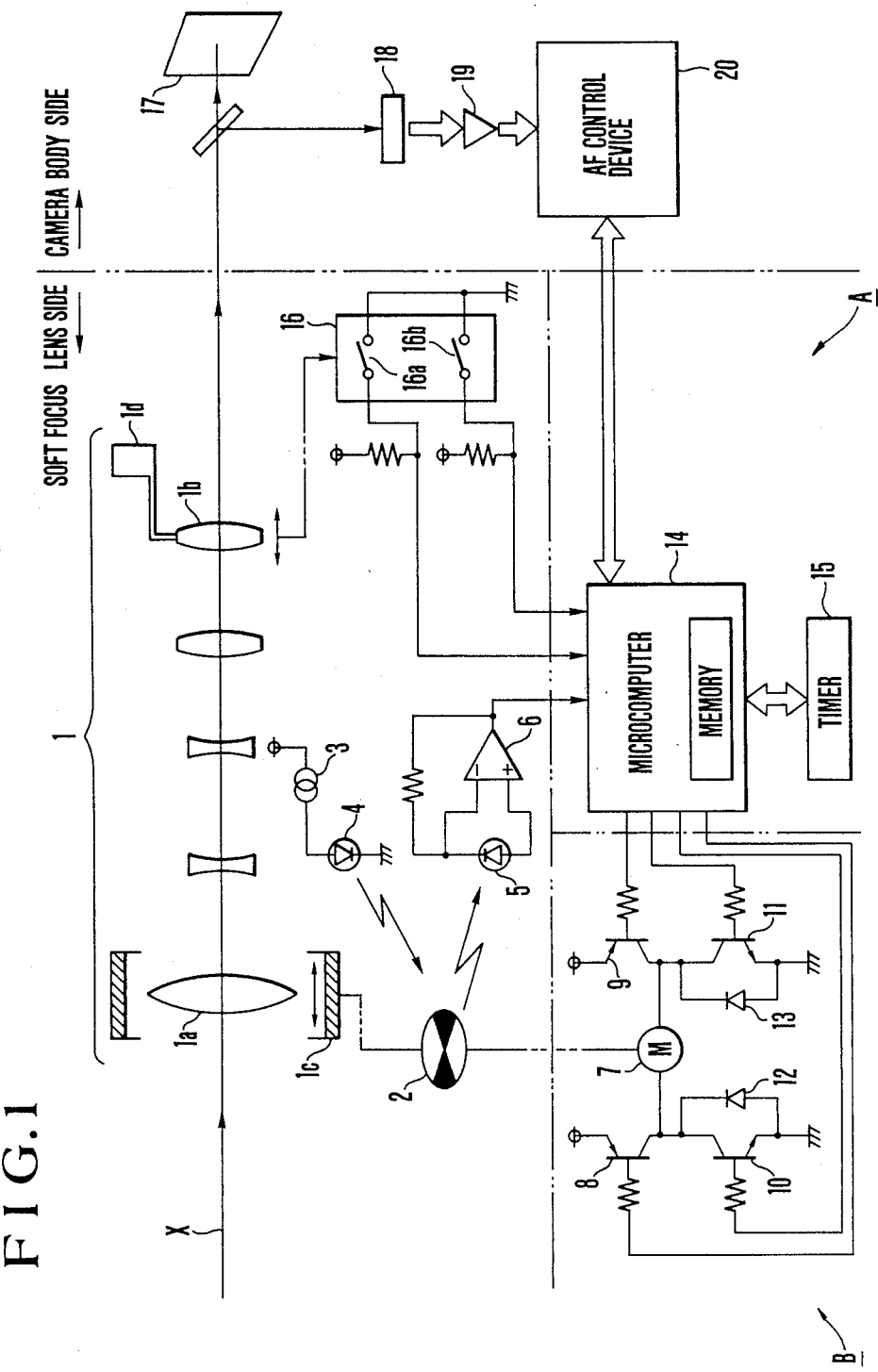
FIG. 1 is a block diagram illustrating an embodiment of the present invention.

FIG. 1 shows one embodiment of the invention.

Reference numberal 1 is a photographic lens for forming an image. A lens 1a for focus adjustment is included in the photographic lens 1 and axially moves to adjust the focus, being supported by a distance ring 1c. A lens 1b for softening is also included in the photographic lens 1 and axially moves to selectively obtain the normal focus and two different degrees of soft focus, namely, soft 1 and soft 2. X is an optical axis of the photographic lens 1. A pulse disc 2 moves in response to rotation of the distance ring 1c holding the lens 1a for focus adjustment. 3 is a constant current source. A light-emitting diode 4 projects light onto the pulse disc 2 to detect the amount of movement of the lens 1a for focus adjustment. The reflected light from the pulse disc 2 is received by a photodiode 5 to detect the amount of movement of the lens 1a for focus adjustment. The photo-electrically converted signal in the photodiode 5 is amplified by an amplifier 6. A motor 7 drives the distance ring 1c through a drive mechanism (not shown). Transistors 8-11 constitute a bridge circuit for controlling the current supply to the motor 7. To brake the motor 7, both ends of its winding are short-circuited by reverse current diodes 12 and 13 together with the transistors 10 and 11. A microcomputer 14 commands a drive control for the distance ring 1c when in the auto-focus mode and when in selective soft control mode. 15 is a programmable timer which is controlled by the microcomputer 14. A soft switch 16 has contacts 16a and 16b arranged so that when the lens 1b for softening is moved by operating a soft control member 1d (for example, a soft control ring having a click mechanism), the contacts 16a and 16b turn on and off in response to its movement as shown in FIG. 2. This may be modified so that the lens 1b for softening is moved by the power of a motor in response to changing over of the soft switch 16. 17 is a film plane of the camera. An image line sensor 18 for auto-focus lies in an optically equivalent position to the film plane 17. 19 is an amplifier. An AF control device 20 computes the defocus amount on the basis of the signal of the image line sensor 18 and gives it to the microcomputer 14. The focus detecting device is well known so its explanation is omitted here. Also, as the photographic lens 1 use may be made of the lens described in the aforesaid application Ser. No. 926,648.

In FIG. 1, the elements from the photographic lens 1 to the soft switch 16 constitute a soft focus lens, but the motor 7, the transistors 8-11, the diodes 12 and 13, the microcomputer 14 and the timer 15 are not necessarily provided in the lens unit. Some of these parts, for example, the microcomputer of a section A and the motor of a section B, or all of them, may be provided in the camera body.

FIG. 2 shows the states of the soft switch 16 in a case where the soft selection is effected in the normal, the soft 1 and soft 2 modes. X represents indefiniteness, H the high level, and L the low level.

Next, the operation of the FIG. 1 embodiment will be described by reference to the flowcharts of FIGS. 3-5.

When the electrical power source is thrown, the operation begins. At first, the microcomputer 14 sets the initial states in a step 21 of FIG. 3. Concretely speaking, the motor 7 drives the lens 1a for focus adjustment. Responsive to this, the pulse disc 2 rotates, reflecting the light projected from the light-emitting diode 4 in pulsating form. This is photoelectrically converted by the photodiode 5. The amplified pulse signal (hereinafter referred to simply as "pulse") is counted by a pulse counter (incorporated in the microcomputer 14). To this purpose, the microcomputer 14 resets the pulse counter, resets the timer 15 and turns off the transistors 8–11. That is, it stops the motor 7. At the same time, it reads in the present state of the soft switch 16 as representing "the last state of the soft switch", and memorizes it in a memory contained in the microcomputer 14.

In a step 22, as will be described later, setting of the drive amount of the distance ring 1c depending on the change of the state of the soft switch 16 is carried out. In a step 23, according to that set value, the distance ring 1c is driven. After the driving ends, the setting of the drive amount of the distance ring 1c depending on the change of the state of the soft switch 16 and the driving are repeated again.

The communication of the defocus amount, etc. from the AF control device 20 is treated by interrupt. Upon acceptance of the communicatinn, the microcomputer 14 interrupts the operation, and carries out its treatment. In a step 24, when the content of that communication is judged to be data other than the defocus amount data, the flow advances to a step 25. After the corresponding communication treatment on it has been performed, the flow returns to the initial operation before the interruption. In the case of having received the defocus amount data, the distance ring drive amount is computed from the defocus amount and is set in a step 26.

Figure 4:
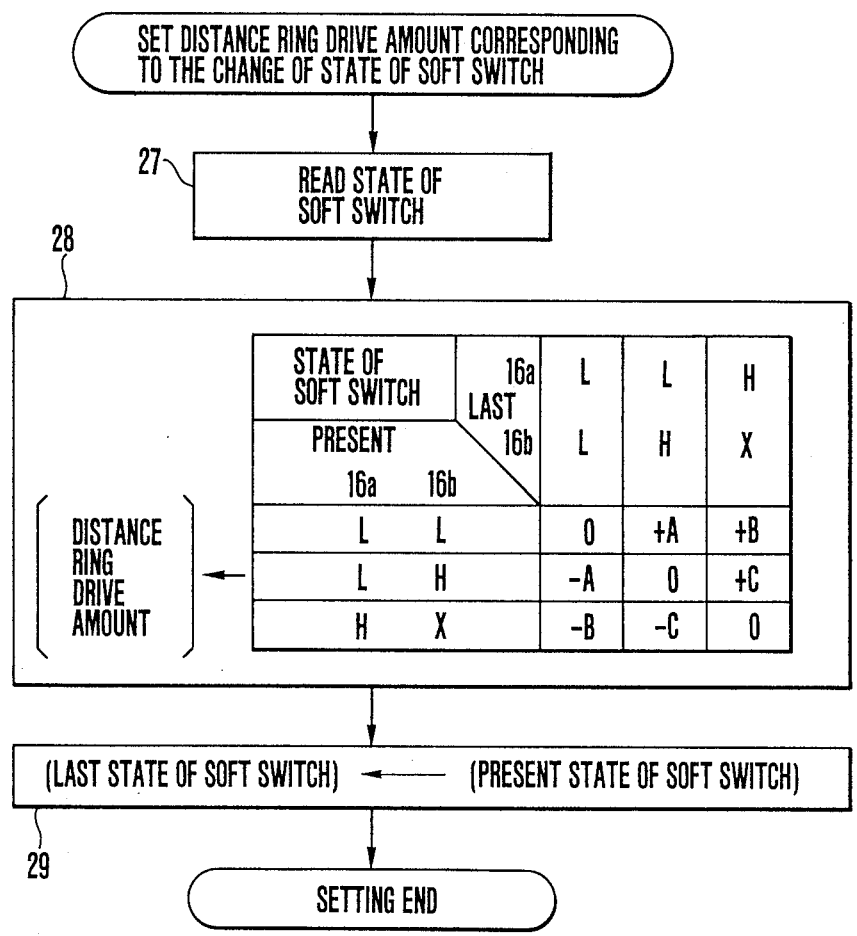
Figure 5:
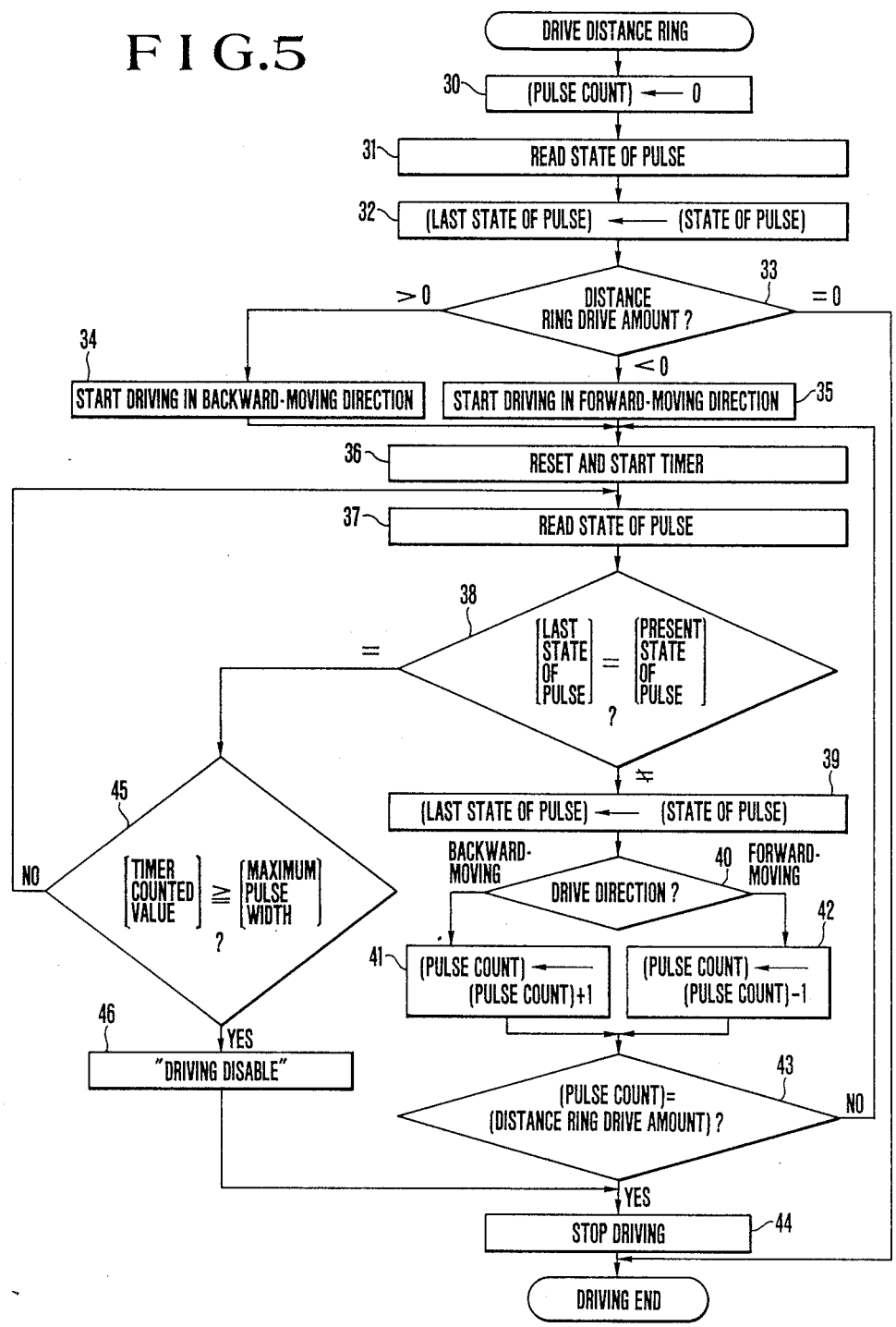

Here, as shown in FIG. 4 and FIG. 5, the setting of the distance ring drive amount depending on the change of the state of the soft switch 16 and the driving of the distance ring are described in detail.

The setting of the distance ring drive amount depending on the change of the state of the soft switch 16 is as follows: As shown in FIG. 4, at first in a step 27, reading in of the state of the soft switch 16 is carried out. Now, from the read "present state of the soft switch" and the memorized "last state of the soft switch", the value shown in the table in step 28 in FIG. 4 is set as the distance ring drive amount. In the table, +A represents the distance ring drive amount which corrects just the shift of the focus when the state of the soft 1 changes to the state of the soft 2; similarly −A from the state of the soft 2 to the state of the soft 1, +B from the state of the normal to the state of the soft 2, −B from the state of the soft 2 to the state of the normal, +C from the state of the normal to the state of the soft 1, and −C from the state of the soft 1 to the state of the normal. Also, when "the present state of the soft switch" is equal to "the last state of the soft switch", in other words, when the state of the soft switch 16 remains unchanged, the distance ring drive amount to be set in the step 28 becomes 0, as a matter of course.

In a step 29, the state of the soft switch 16 which has been read in by now is memorized as "the last state of the soft switch" for the purpose of setting the distance ring drive amount corresponding to the next state change of the soft switch, and the setting of the distance ring drive amount ends.

The driving of the distance ring in the step 23 operates as follows. As shown in FIG. 5, at first, in a step 30, the pulse counter incorporated in the microcomputer 14 is reset to 0. In the next step 31, the state of the pulse obtained from the pulse disc 2, the light-emitting diode 4 and the photodiode 5 and produced in correspondence to the amount of movement of the lens 1a for focus adjustment is read in. In a step 32, this is memorized as the initial value of the last state of the pulse. In a step 33, whether the set distance ring drive amount is positive or negative or 0 is judged. When the distance ring drive amount is 0, the operation proceeds to "driving end" to end the flow. In a step 34 or 35, driving of the distance ring 1c in the corresponding direction (backward-moving or forward-moving) is started. In a step 36, the count value of the timer is returned to 0 and then counting is started.

In a step 37, the state of the pulse produced in response to the driving of the distance ring 1c is read in. In a step 38, the present state of the pulse is compared with the last state of the pulse. In the case of them being not equal, the present state of the pulse is memorized as a last state of the pulse in a step 39. In a step 40, the drive direction is discriminated. In the backward-moving case, "1" is added to the value of the pulse counter in a step 41. In the forward-moving case, "1" is subtracted from the value of the pulse counter in a step 42. In a step 43, whether or not the value of the pulse counter has become equal to the distance ring drive amount is judged. When equal, the driving is stopped in a step 44. Thus, the driving of the distance ring ends. When it does not become equal yet, the driving is continued as it is, and the timer 15 is reset to obtain a pulse width again. Hence, the routine of the steps 36–43 is repeated.

In the step 38, if the state of the pulse remains unchanged between the present and last times, then whether or not the counted value of the timer 15 which began at the time the start of driving, or at the time of the rising edge or the falling edge of the pulse has reached the time that is not recognized as the pulse width during the driving (the time during which the pulse is kept on hold at either the high level or the low level) is determined, in other words, the time that should be recognized as it is stopping. If not reached, then the routine of the steps 37, 38 and 45 is repeated, causing the driving to continue as it is. If it has been reached, then the driving disable state is indicated to the AF control device 20 in a step 46. Then an advance is made to a step 44 to stop the driving. Thus, the driving of the distance ring 1c ends.

According to this embodiment, without the necessity of any complicated mechanical linkage between the lens 1b for softening and the lens 1a for focus adjustment, the shift of the focal point due to the selective soft control can be eliminated. All that necessary to this purpose is to provide the soft switch 16 and add the functions shown in FIG. 4 to the microcomputer 14.

The present invention is applicable even to the single lens reflex camera systems having no auto-focus function. For this case, a drive means such as a motor solely used for compensating for the image shift due to the selective soft control has to be provided.

As has been described above, according to the present invention, provision is made of detecting means for detecting the movement of the lens for softening, and computing means for determining the amount of movement of the lens for focus adjustment to cancel the shift of the focal point resulting from the movement of the lens for softening and for producing an output to the drive means for moving the lens for focus adjustment, whereby the shift of the focal point due to the selective soft control is automatically compensated for, thus making it possible to eliminate the problem that the in-focus state is broken by the selective soft control.

What is claimed is:

1. An optical apparatus for producing a special photographic effect, comprising:
   an optical assembly having (1) a movable lens component arranged to move along an optical axis to produce a special photographic effect, and (2) a focusing lens component axially movable for focusing;
   a driver for driving said focusing lens component in an axial direction;
   a detecting device for detecting the axial position of said focusing lens component to output positional information;
   a mode selecting device for selecting a normal photographic mode or a special photographic effect mode, said special photographic mode being effected by moving said movable lens component in the axial direction, said mode selection means providing the output signal corresponding to the amount of movement of said movable lens component; and
   a signal forming device for forming a compensation signal for driving said driver to move said focusing lens component by a distance necessary to compensate for a focus error of said optical assembly resulting from movement of said movable lens component on the basis of said signal corresponding to the amount of movement of said movable lens component and said positional information.

2. An optical apparatus according to claim 1, further comprising a focus detecting device receptive of a light flux passed through said optical assembly for detecting a focus adjustment state of said optical assembly and for driving said driver through said signal forming device to bring said optical assembly into an in-focus state.

3. An optical apparatus according to claim 1, wherein said special photographic effect is a soft focus effect.

4. An optical apparatus according to claim 1, wherein said mode selecting device is arranged to select, in the special photographic effect mode, a plurality of sub-modes of different degrees of effect by varying the amount of movement of said movable lens component.

5. An optical apparatus according to claim 4, wherein said mode selecting device includes means for moving said movable lens component and signal generating means for generating the signal corresponding to the amount of movement of said movable lens component.

6. An optical apparatus according to claim 4, wherein said detecting device generates a predetermined number of pulses in relation to the movement of said focusing lens component.

7. A photographic lens for attachment to a camera body, said camera body having a focus detecting device and a computing device for producing a drive signal for driving a focusing lens component of said photographic lens on the basis of a signal output from said focus detecting device and a signal output from said photographic lens, comprising:
   an optical assembly having a movable lens component arranged to move along an optical axis to produce a special photographic effect;
   a detecting device for detecting the axial position of said focusing lens component to output positional information;
   a mode selecting device for selecting a normal photographic mode or a special photographic mode, said special photographic mode being effected by moving said movable lens component in an axial direction, said mode selecting means providing an output signal corresponding to the amount of movement of said movable lens component; and
   means for applying the signal corresponding to the amount of movement of said movable lens component and said positional information to said computing device to cause said computing device to compute the amount of movement of said focusing lens component necessary to compensate for a focus error of said optical assembly resulting from the movement of said movable lens component.

8. A photographic lens according to claim 7, wherein said special photographic effect is a soft focus effect.

9. A photographic lens according to claim 7, wherein said mode selecting device is arranged to select, in the special photographic effect mode, a plurality of sub-modes of different degrees of effect by varying the amount of movement of said movable lens component.

10. A photographic lens according to claim 9, wherein said mode selecting device includes means for moving said movable lens component and signal generating means for generating signal corresponding to the amount of movement of said movable lens component.

11. A photographic lens according to claim 7, wherein said detecting device generates a predetermined number of pulses in relation to the movement of said focusing lens component.

12. A photographic lens for attachment to a camera body, said camera body having a focus detecting device, a driver for moving a focusing lens component of said photographic lens along an optical axis and a computing device for producing a drive signal for driving said driver on the basis of a signal output from said focus detecting device and a signal output from said photographic lens, comprising:
   an optical assembly having (1)a movable lens component arranged to move along an optical axis to produce a special photographic effect, and (2) said focusing lens component;
   a detecting device for detecting the axial position of said focusing lens component to output positional information;
   a mode selecting device for selecting a normal photographic mode or a special photographic mode, said special phtotgraphic mode being effected by moving said movable lens component in an axial direction, said mode selecting means providing an output signal corresponding to the amount of movement of said movable lens component; and
   means for applying the signal corresponding to the amount of movement of said movable lens component and said positional information to said computing device to cause said computing device to compute the amount of movement of said focusing lens component to compensate for a focus error of said optical assembly resulting from the movement of said movable lens component.

13. A photographic lens according to claim 12, wherein said special photographic effect is a soft focus effect.

14. A photographic lens according to claim 12, wherein said mode selecting device is arranged to select, in the special photographic effect mode, a plurality of sub-modes of different degrees of effect by varying the amount of movement of said movable lens component.

15. A photographic lens according to claim 14, wherein said mode selecting device includes means for moving said movable lens component and signal generating means for generating the signal corresponding to the amount of movement of said movable lens component.

16. A photographic lens according to claim 12, wherein said detecting device generates a predetermined number of pulses in relation to the movement of said focusing lens component.

* * * * *

UNITED STATES PATENT AND TRADEMARK OFFICE
CERTIFICATE OF CORRECTION

PATENT NO. : 4,957,354

DATED : September 18, 1990

INVENTOR(S) : Shinichi Matsuyama

It is certified that error appears in the above-identified patent and that said Letters Patent is hereby corrected as shown below:

COLUMN 1:

Line 40, "which," should read --which--.

Line 51, "62-205308." should read --62-205308).--.

Line 62, "state" should read --state wherein--.

COLUMN 3:

Line 24, "communicatinn," should read --communication,--.

COLUMN 4:

Line 34, "time" should read --time of--.

UNITED STATES PATENT AND TRADEMARK OFFICE
CERTIFICATE OF CORRECTION

PATENT NO. : 4,957,354

DATED : September 18, 1990

INVENTOR(S) : Shinichi Matsuyama

It is certified that error appears in the above-identified patent and that said Letters Patent is hereby corrected as shown below:

<u>COLUMN 6</u>:

Line 24, "signal" should read --the signal--.

Line 38, "(1)a" should read --(1) a--.

Line 47, "phtotgraphic" should read --photographic--.

Signed and Sealed this

Seventh Day of July, 1992

Attest:

DOUGLAS B. COMER

Attesting Officer

Acting Commissioner of Patents and Trademarks